No. 865,461.
PATENTED SEPT. 10, 1907.
P. S. WARD.
MACHINE FOR CUTTING CRACKERS AND THE LIKE.
APPLICATION FILED APR. 23, 1906.
2 SHEETS—SHEET 1.
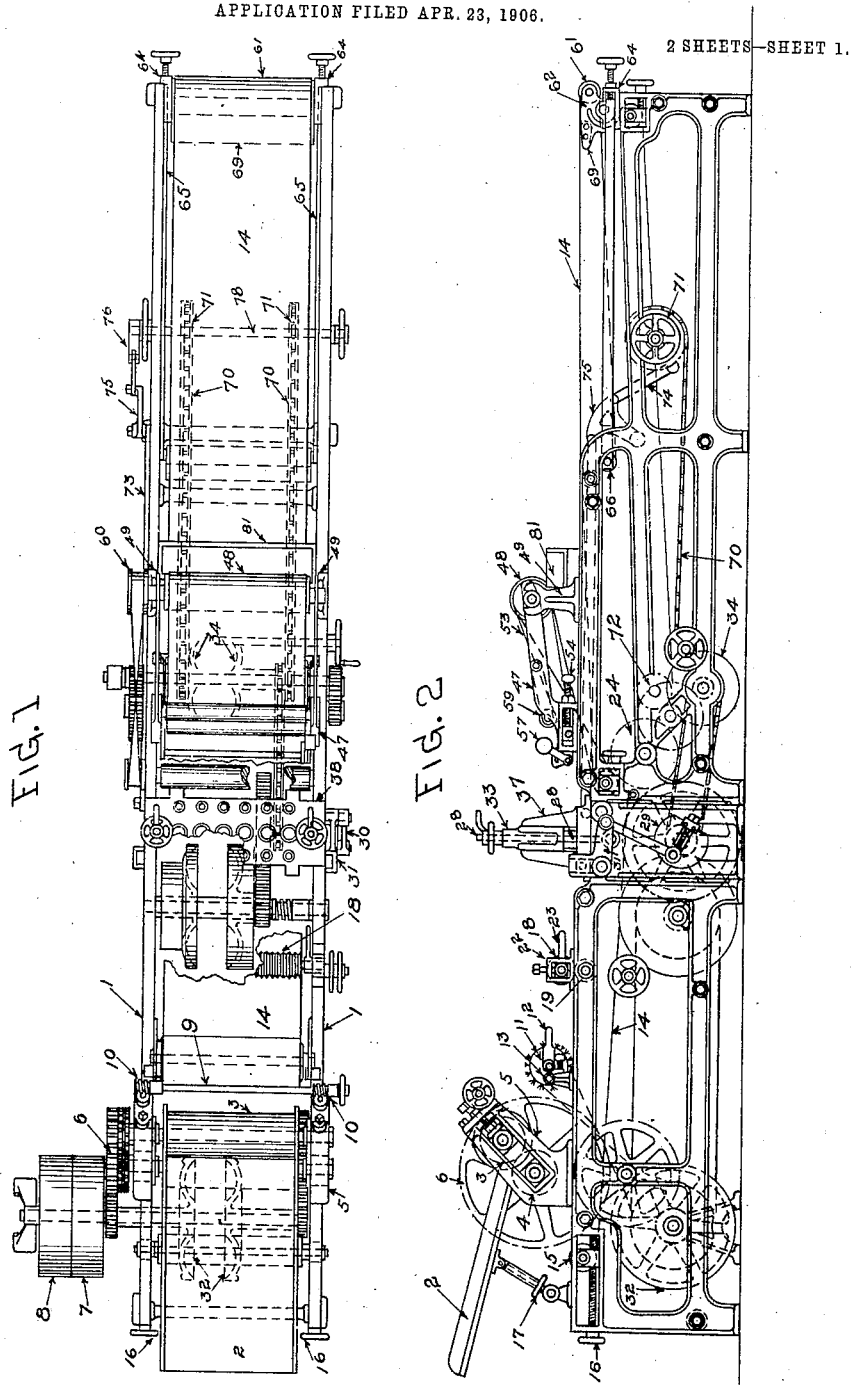
WITNESSES
INVENTOR
Paul S. Ward
by Alfred M. Allen
Atty No. 865,461.
PATENTED SEPT. 10, 1907.
P. S. WARD.
MACHINE FOR CUTTING CRACKERS AND THE LIKE.
APPLICATION FILED APR. 23, 1906.
2 SHEETS—SHEET 2.
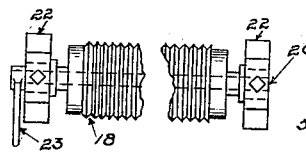
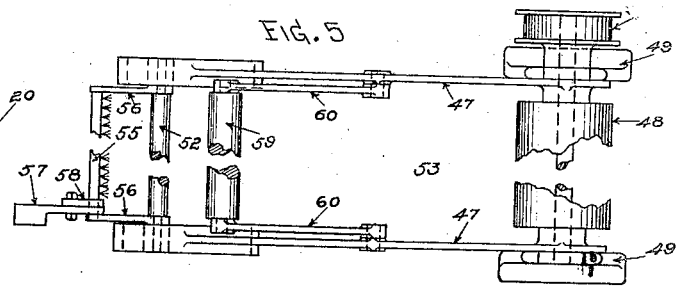
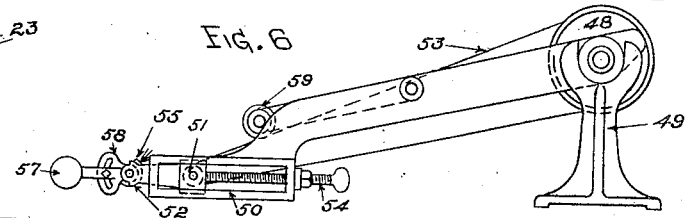
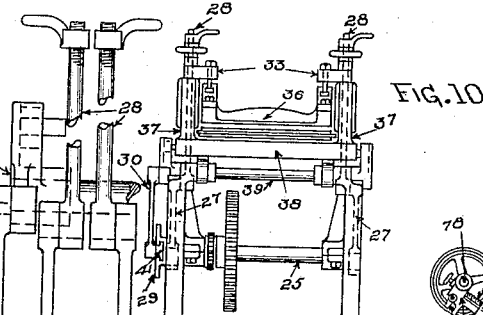
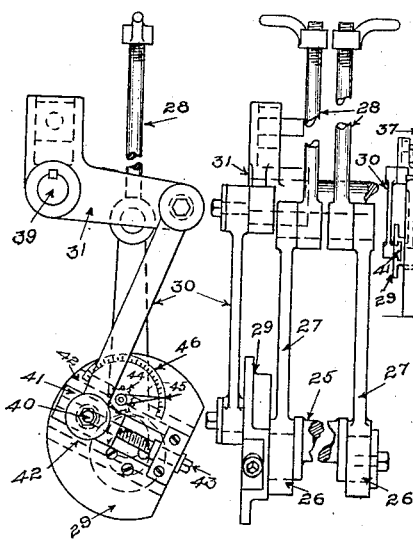
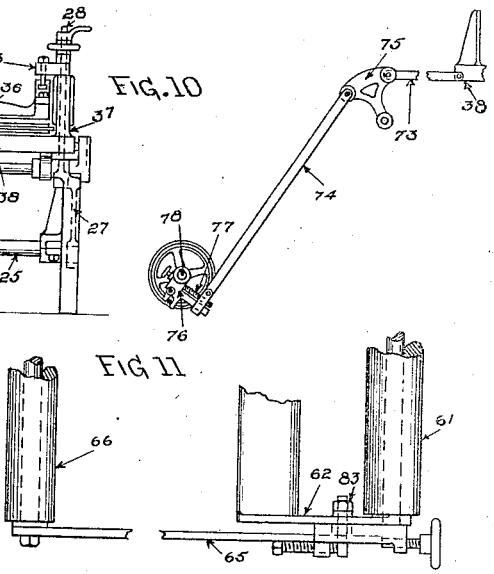
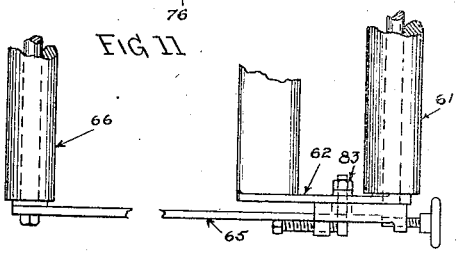
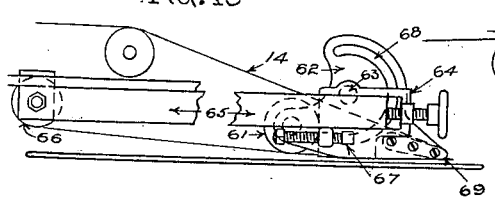
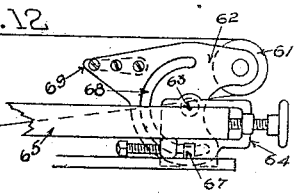
WITNESSES
INVENTOR
Paul S. Ward
by Alfred M. Allen
Atty

UNITED STATES PATENT OFFICE.

PAUL S. WARD, OF COVINGTON, KENTUCKY, ASSIGNOR TO THE J. H. DAY COMPANY, OF CINCINNATI, OHIO, A CORPORATION OF OHIO.

MACHINE FOR CUTTING CRACKERS AND THE LIKE.

No. 865,461.    Specification of Letters Patent.    Patented Sept. 10, 1907.

Application filed April 23, 1906. Serial No. 313,247.

*To all whom it may concern:*

Be it known that I, PAUL S. WARD, a citizen of the United States, residing in Covington, in the county of Kenton and State of Kentucky, have invented certain new and useful Improvements in Machines for Cutting Crackers and the Like, of which the following is a full, clear, and exact description, reference being had to the accompanying drawings, forming part of this specification.

My improvements relate to machines for cutting crackers, cakes, lozenges, and the like, from the dough sheet, and the purpose of the invention is to provide a machine, in which the crackers may be cut from the sheet by a cutter moving in unison with the feed of the sheet through the machine, so that the dough sheet may be fed continuously through the machine without stopping the sheet during the cutting stroke of the dies, and the invention consists of that certain novel construction and arrangement of the parts to be hereinafter particularly pointed out and claimed.

In the drawings, Figure 1 is a plan view of my improved machine. Fig. 2 is a side elevation of same. Fig. 3 is a front elevation, and Fig. 4 is a side elevation of one of the impression rolls for forming a pattern on the dough sheet previous to cutting into cakes. Fig. 5 is a plan view of the mechanism for drawing the scrap dough out the sheet after the cutting operation. Fig. 6 is a side elevation of same. Fig. 7 is a side elevation in detail of the mechanism for producing the uniform movement of the cutting dies in connection with the dough sheet, which mechanism may be briefly called the cutter oscillator. Fig. 8 is a front elevation of same, with parts broken away. Fig. 9 is a front elevation of the cutting mechanism, including the cutter oscillator, and the cutting devices in connection therewith. Fig. 10 is a detail side elevation of the device for spacing the finished goods on the pans. Fig. 11 is a plan, and Figs. 12 and 13 are side elevations respectively of the device, carrying the main feeding apron showing different positions of same when the machine is set for delivering the finished goods.

The entire machine is designed for taking the dough in partly finished condition, rolling it into the sheet desired, feeding the sheet to the oscillating cutter, which moves at a uniform rate with the feed of the sheet in order that there may be no disturbance during the cutting operation, and devices are then provided for stripping or pulling out the scrap and removing same, leaving the finished goods on the feeding apron, whence they are either delivered to the peel or pan, as the case may be, ready for the oven.

1—1 are side standards running the full length of the machine, and properly braced together by cross braces or struts to form an elongated framework for holding all of the operating parts.

At the front end of the machine are mounted the devices for feeding the dough sheet to the main apron. These devices are of any well known construction, and as illustrated in the drawings, they consist of a feed table 2 for delivering the dough to the rollers 3—4 for finishing the dough into the proper sized sheet. These rollers 3 and 4 are mounted in the side standards 5, and they are driven by a gear 8 mounted on the lower roll shaft from a suitable train of gears from the main driving shaft, upon which are mounted the tight and loose pulleys 7 and 8.

9 is a shaft carrying the worms 10 for adjusting the pressure of the roll 3 to vary the thickness of the sheet.

11 is a cylindrical brush, mounted in standards across the machine, so that the brush will bear on the dough sheet for drying the top of the sheet and brushing off any crumbs, and in order to start the sheet properly, this brush roller is mounted in arms 12, pivoted at 13, so that the brush can be thrown out of the way.

The dough is delivered from the rollers 3—4 onto a traveling apron 14, which is carried by suitable devices from one end of the machine to the other, with its upper surface along the top of the framework to carry the dough sheet from one end of the machine to the other, and driven by the driving roller 24. At the other end of the machine this apron runs over the roller 15, which is adjustable by the hand screw 16, operating on the box, in which the roller is mounted, so as to take up any slack of the apron. The table 2 is also adjustable at any desired angle by the hand screw 17.

Located just beyond the brush 11, and arranged horizontally across the machine to bear on the surface of the dough sheet and apron is the impression roller 18, carrying any desired pattern for the impression of same on the dough sheet, and this impression roller bears on the roller 19, directly underneath the impression roller. The shaft 20 which carries the impression roller 18 is mounted eccentrically in the journal boxes 21 in the standards 22, which support this impression roller, and by means of the hand levers 23 in starting the dough sheet through the machine, the impression roller may be raised so as to give room for passing the sheet thereunder.

As heretofore stated, the main purpose of my machine is to provide a longitudinal movement for the cutters, so that while the feeding apron carries the dough sheet uniformly through the machine without stopping the cutters as they operate on the sheet may travel uniformly therewith, and in order to accomplish this result, I provide as follows:

A crank shaft 25, suitably mounted on the frame is provided at its outer ends with the cranks 26 and the adjustable throw crank disk 29, which crank shaft, through the pitmen 27—27 and the connection rods 28—28, actuate the cutter head 33 vertically, so as to alternately cut and clear the sheet of dough. This cutter head carries the frame 36, in which are mounted the cutting dies, and the cutter heads 33—33 slide vertically in the standards 37, mounted on the ends of the bed 38.

The movement of the cutter horizontally, so as to act in unison with the forward movement of the sheet of dough is effected by the adjustable crank 29 and the intermediate pitman 30 and bell crank 31. The bell crank 31 is mounted on the rock shaft 39 secured in the frame, and the upper arm of the bell crank is pivoted on the end of the bed 38 of the cutter frame, so that as the bell crank is rocked, the entire cutting mechanism will be reciprocated in the line of the travel of the apron. In this manner the horizontal movement of the cutter at the instant of passing the lowest point of the vertical movement of the cutter, will have a velocity equal to that of the crank 29 in its circular path. It is, therefore, evident that if this crank has a variable radius, so as to make the circumference of its path equal to the movement of the apron in the same interval of time, the cutter and cloth will move in exact unison, and in order to provide for the different sizes of patterns to be cut, and the different rates at which the finished product must be handled, we provide both means for varying the rate of delivery of the sheet and the rate of movement of the cutter, the former being accomplished by the speed controlling device 32, and the latter by the adjustment of the length of the crank arm on the crank disk 29.

The pitman 30 carries the crank pin 40, which is provided with a T-head 41, which slides in guides 42—42 on the crank disk 29, and the adjustment is obtained by means of the screw 43, which is threaded through the inner end of the crank pin, so that by adjusting the screw 43, the crank pin may be adjusted to and from the center of the shaft 25.

The inner end of the crank pin 40 carries a rack which engages a pinion 44 on a stud on the disk 29, which stud carries the pointer 45, and a dial plate 46 is provided to indicate the position of the crank pin with relation to its center, in order to show the rate of its movement per revolution in its circular path, and the marks on the dial plate, therefore, indicate the rate of speed at which the apron must travel to correspond with the movement of the cutter.

The apron driving drum 24 is actuated through a train of gears, including the speed changing device 34 from the crank shaft 25, the function of which speed changing device is to move the apron at the same rate as the oscillating crank, it being obvious that if the rate of cutting of the machine be increased, the cloth will likewise speed up in the same proportion, being driven from the crank shaft 25.

In order to remove the scrap from the cut sheet, I provide as follows: 47—47 is a side frame which carries on its outer end a roller 48, the ends of which rest loosely in the forked standards 49—49. The inner end of the frame 47—47 is provided with a housing 50, in which slides the journal boxes 51 carrying the pick-up roller 52, and over these rollers 48 and 52 runs the scrap apron 53. 54—54 are adjusting screws which bear against the boxes 51 for adjusting the position of the pick-up roller 52 to give proper tension to the apron. 55 is a brush extending horizontally across the device between the side frames and carried on arms 56—56 on the boxes 51. This brush when in working position bears on the dough sheet to hold the cut crackers on the apron while the scrap is fed away by the scrap apron 53. This brush is pivoted in the ends of the arms 56, so that it can be thrown out of the way when it is desired to start the scrap onto the scrap apron 53, and the brush is held either in or out of position by the weighted lever 57, while the tension of the brush on the sheet is controlled by the adjustment of the angle of the brush on the sheet which is obtained by the varying adjustments in the slotted quadrant 58.

In order to hold the scrap on the scrap apron 53 without slip, I provide the roller 59, which is mounted in the swinging arms 60 pivoted in the frame 47, and which roller rests on the apron 53.

In order that the scrap apron may travel at the proper rate of speed with the main apron, the shaft of the roller 48 is provided with the pulley 60, which is driven by belt from the driving mechanism of the main apron. The scrap is delivered from the apron 53 into the box 81, provided for that purpose.

The machine is designed for delivering the finished goods, either to the peel, or the pans, and I have, therefore, illustrated a construction for converting the machine from a peeling machine to a panning machine. The outermost roller 61 for the apron 14 is journaled in a turn-over frame 62, pivotally mounted at 63 in the head 64 of the frame 65. This frame 65 carries on its inner end the roller 66, and the entire frame is slidably mounted in the main frame of the machine.

In the positions shown in Figs. 1, 2 and 12, the machine is designed for peeling, and in order to convert the machine into a panning machine, it is necessary to slide the frame 65 within the machine, and at the same time to lower the traveling apron, so as to deliver the goods into the pans.

In order to lower the apron, the nut 83 on the stud 67 can be loosened and the frame 62 turned on the pivot 63 to bring the stud, which is secured to the head 64, into the other end of the slot 68 in the frame 62, and then the parts will stand in the position shown in Fig. 13 with the apron 14 running over the end of the frame 69. Then the frame 65 is pushed in so as to bring the outer end of the frame over the pans, which are placed in succession on the pan carrier, which consists of two parallel sprocket chains 70, provided at proper intervals with projections to serve as pan drivers. These chains run over the outer sprocket wheel 71, and over the driving sprocket on the shaft 72, which shaft is driven by a train of gears from the driving mechanism for the main apron, the connection between this sprocket 72 being such that when desired the sprocket chain carrier may have its speed of travel increased as will be hereinafter described.

The pans are placed on the carrier and carried forward in succession, and the finished goods delivered thereto at the point 69.

In order that the pan, when desired, may be given momentarily an accelerated movement, just as the goods are delivered thereto, I connect the cutting bed 38 by the connecting bars 73 and 74, united by the pivoted bell crank 75, with a ratchet device 76, which is adjustable by the screw 77, so that the point of attachment of the connecting rod 74 may be shifted towards the center of the shaft 78, upon which the sprocket 71 is mounted, the result being that when this adjustment is had, the shaft 78 by the horizontal movement of the cutter will be given a slight accelerated movement momentarily.

Having thus described my invention, what I claim as new, and desire to secure by Letters Latent, is:—

1. In a machine for cutting crackers and the like, means for feeding the sheet of dough continuously through the machine, reciprocating mechanism for cutting same into cakes, with means for moving the cutting mechanism during the cutting operation in line with and at the same rate of speed as the continuously moving sheet.

2. In a machine for cutting crackers and the like, means for feeding the sheet of dough continuously through the machine, reciprocating mechanism for cutting same into cakes, with means for moving the cutting mechanism during the cutting operation in line with and at the same rate of speed as the continuously moving sheet, with means for removing the scrap from the cut sheet.

3. In a machine for cutting crackers and the like, means for feeding the sheet of dough continuously through the machine, a cutter acting at right angles to the sheet, a frame carrying the cutter, with connecting mechanism therefor with the means for feeding the sheet, whereby the frame and cutter may be moved in unison, and in line with the continuously moving sheet.

4. In a machine for cutting crackers and the like, an endless apron, with means for moving same to carry the sheet of dough continuously through the machine, reciprocating mechanism for cutting same into cakes, with means for moving the cutting mechanism during the cutting operation in line with and at the same rate of speed as the endless apron.

5. In a machine for cutting crackers and the like an endless apron, with means for moving same to carry the sheet of dough continuously through the machine, a cutter acting at right angles to the apron, a frame carrying the cutter, with connecting mechanism therefor with the apron moving mechanism, whereby the frame and cutter may be moved in unison, and in line with the apron.

6. In a machine for cutting crackers and the like, an endless apron, with means for moving same to carry the sheet of dough continuously through the machine, reciprocating mechanism for cutting the dough sheets into cakes, with means for moving the cutting mechanism during the cutting operation in line with and at the same rate of speed as the continuously moving sheet.

7. In a machine for cutting crackers and the like, rollers for forming a sheet of dough, means for feeding the sheet of dough continuously through the machine, reciprocating mechanism for cutting same into cakes, with means for moving the cutting mechanism during the cutting operation in line with and at the same rate of speed as the continuously moving sheet.

8. In a machine for cutting crackers and the like, rollers for forming the sheet of dough, an endless apron, with means for moving same to feed the sheet continuously through the machine, reciprocating mechanism for cutting same into cakes, with means for moving the cutting mechanism during the cutting operation in line with and at the same rate of speed as the continuously moving sheet.

9. In a machine for cutting crackers and the like, rollers for forming the sheet of dough, an endless apron, with means for moving same to feed the sheet continuously through the machine, a cutter acting at right angles to the sheet, a frame carrying the cutter, with connecting mechanism therefor with the means for moving the apron, whereby the frame and cutter may be moved in unison and in line with the traveling apron.

10. In a machine for cutting crackers and the like, means for feeding the sheet of dough continuously through the machine, reciprocating mechanism for cutting same into cakes, a crank shaft with adjustable crank thereon and connecting mechanism therefor with the cutting mechanism and the sheet feeding means, whereby the movement of the cutting mechanism in unison with the travel of the dough sheet may be equalized.

11. In a machine for cutting crackers and the like, means for feeding the sheet of dough continuously through the machine, a cutter acting at right angles to the sheet, a frame carrying the cutter, a crank shaft with adjustable crank thereon, connecting mechanism therefor with the cutting bed and the sheet feeding means, whereby the movement of the cutting bed in unison with the travel of the dough sheet may be equalized.

12. In a machine for cutting crackers and the like, an endless apron, with means for moving same to carry the sheet of dough continuously through the machine, a cutter acting at right angles to the apron, a frame carrying the cutter between which and the cutter the apron passes, a crank shaft with adjustable crank thereon, and connecting mechanism therefor with the cutting bed and the driving mechanism for the endless apron, whereby the movement of the cutting bed in unison with the travel of the apron may be equalized.

13. In a machine for cutting crackers and the like, means for feeding the sheet of dough continuously through the machine and cutting mechanism for cutting the sheet into cakes, with means for moving the cutting mechanism in unison with the travel of the dough sheet comprising a crank shaft with adjustable crank thereon, a bell crank lever, one end of which is connected with the cutting mechanism, and the other with the adjustable crank, with means for operating the crank shaft and the feeding mechanism for the dough sheet simultaneously.

14. In a machine for cutting crackers and the like, means for feeding the sheet of dough continuously through the machine, mechanism for cutting same into cakes, a crank shaft with adjustable crank thereon and connecting mechanism therefor with the cutting mechanism and the sheet feeding means, whereby the movement of the cutting mechanism in unison with the travel of the dough sheet may be equalized, with means for indicating the travel of the sheet between successive strokes of the cutter.

PAUL S. WARD.

Witnesses:
GLENA PRITCHARD,
EDW. C. MATLOCK.